United States Patent
Sawin et al.

(10) Patent No.: US 9,104,578 B2
(45) Date of Patent: Aug. 11, 2015

(54) DEFINING ADDRESS RANGES USED TO CACHE SPECULATIVE READ DATA

(75) Inventors: James David Sawin, Sterling, MA (US); Luke William Friendshuh, Elko, MN (US); Sumanth Jannyavula Venkata, Shakopee, MN (US); Ryan James Goss, Prior Lake, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 119 days.

(21) Appl. No.: 13/543,036

(22) Filed: Jul. 6, 2012

(65) Prior Publication Data

US 2014/0013047 A1 Jan. 9, 2014

(51) Int. Cl.
*G06F 12/00* (2006.01)
*G06F 12/08* (2006.01)

(52) U.S. Cl.
CPC ........ *G06F 12/0862* (2013.01); *G06F 12/0895* (2013.01)

(58) Field of Classification Search
CPC .......................... G06F 12/0862; G06F 12/0811
USPC .......................................................... 711/113
See application file for complete search history.

(56) References Cited

U.S. PATENT DOCUMENTS

| | | | |
|---|---|---|---|
| 5,420,998 A | 5/1995 | Horning | |
| 6,339,811 B1 | 1/2002 | Gaertner et al. | |
| 7,305,526 B2 * | 12/2007 | Benhase et al. | 711/154 |
| 7,613,876 B2 | 11/2009 | Bruce et al. | |
| 7,979,631 B2 | 7/2011 | Ahn et al. | |
| 8,015,360 B2 | 9/2011 | Hong et al. | |
| 8,032,700 B2 | 10/2011 | Bruce et al. | |
| 8,489,820 B1 | 7/2013 | Ellard | |
| 8,583,879 B2 | 11/2013 | Na et al. | |
| 2003/0105937 A1* | 6/2003 | Cooksey et al. | 711/203 |
| 2003/0105938 A1 | 6/2003 | Cooksey et al. | |
| 2003/0105940 A1 | 6/2003 | Cooksey et al. | |
| 2003/0200393 A1* | 10/2003 | Cornaby et al. | 711/118 |
| 2004/0123043 A1 | 6/2004 | Rotithor et al. | |
| 2005/0108491 A1 | 5/2005 | Wong et al. | |
| 2005/0172074 A1 | 8/2005 | Sinclair | |
| 2006/0248387 A1 | 11/2006 | Nicholson et al. | |
| 2007/0022241 A1 | 1/2007 | Sinclair | |
| 2007/0288692 A1 | 12/2007 | Bruce et al. | |
| 2008/0059694 A1 | 3/2008 | Lee | |

(Continued)

OTHER PUBLICATIONS

Ahmadi et al., "A Cache Architecture for Counting Bloom Filters", 15th IEEE International Conference on Networks, 2007, pp. 218-223.

(Continued)

*Primary Examiner* — Aimee Li
*Assistant Examiner* — Prasith Thammavong
(74) *Attorney, Agent, or Firm* — Hollingsworth Davis, LLC

(57) ABSTRACT

A host read request affects a request address range of a main storage. A speculative address range proximate to the request address range is defined. Speculative data stored in the speculative address range is not requested via the host read request. A criterion is determined that is indicative of future read requests of associated with the speculative data. The speculative data is copied from the main storage to at least one of a non-volatile cache and a volatile cache together with data of the host read request in response to the criterion meeting a threshold. The non-volatile cache and the volatile cache mirror respective portions of the main storage.

18 Claims, 6 Drawing Sheets

(56) References Cited

U.S. PATENT DOCUMENTS

| | | |
|---|---|---|
| 2010/0095053 A1* | 4/2010 | Bruce et al. .................. 711/103 |
| 2010/0325352 A1 | 12/2010 | Schuette et al. |
| 2011/0145489 A1 | 6/2011 | Yu et al. |
| 2012/0210041 A1 | 8/2012 | Flynn et al. |
| 2012/0266175 A1 | 10/2012 | Zheng |
| 2012/0317364 A1 | 12/2012 | Loh |
| 2013/0024625 A1 | 1/2013 | Benhase et al. |
| 2013/0268728 A1 | 10/2013 | Ramanujan et al. |
| 2013/0339617 A1 | 12/2013 | Averbouch et al. |

OTHER PUBLICATIONS

File History for U.S. Appl. No. 13/543,123.
File History for U.S. Appl. No. 13/542,990.
File History for U.S. Appl. No. 13/543,303.

* cited by examiner

DEFINING ADDRESS RANGES USED TO CACHE SPECULATIVE READ DATA

CROSS-REFERENCE TO RELATED APPLICATIONS

U.S. Publication No. 2014/0013052 is incorporated by reference.

SUMMARY

The present disclosure is related to systems and methods that facilitate defining address ranges used to cache speculative read data. In one embodiment, a host read request affects a request address range of a main storage. A speculative address range proximate to the request address range is defined. Speculative data stored in the speculative address range is not requested via the host read request. A criterion is determined that is indicative of future read requests of associated with the speculative data. The speculative data is copied from the main storage to at least one of a non-volatile cache and a volatile cache together with data of the host read request in response to the criterion meeting a threshold. The non-volatile cache and the volatile cache mirror respective portions of the main storage.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to hybrid data storage devices, such as solid-state, hybrid, hard disk drives (HDDs). Generally, a hybrid HDD utilizes a combination of non-volatile, solid-state memory (e.g., flash memory) and conventional HDD media (e.g., magnetic disks) to provide performance approaching that of a solid-state drive (SSD), yet without the costs commonly associated with SSDs. In the present disclosure, a hybrid drive architecture is described that uses an SSD as a non-volatile cache for HDD media, and is sometimes referred to as an HDD/SSD hybrid storage device. However, it will be appreciated that the concepts described herein may be applicable to any mixed-storage-media hybrid device that utilizes similar caching mechanisms.

An HDD/SSD hybrid drive combines features and technologies of conventional HDDs and SSDs. A hybrid drive may include a main storage (e.g., one or more rotating magnetic disks), a volatile primary cache, and a non-volatile secondary cache. The primary cache may use a relatively small amount of volatile random access memory (RAM), while the secondary cache may uses a relatively large amount of non-volatile solid state memory that is kept coherent with the main storage. The description below is directed to, among other things, a scheme for selecting data to be moved into the secondary cache. The scheme is intended to optimize performance under certain environments in which the drive may be highly/fully utilized, such as enterprise storage.

Figure 1:
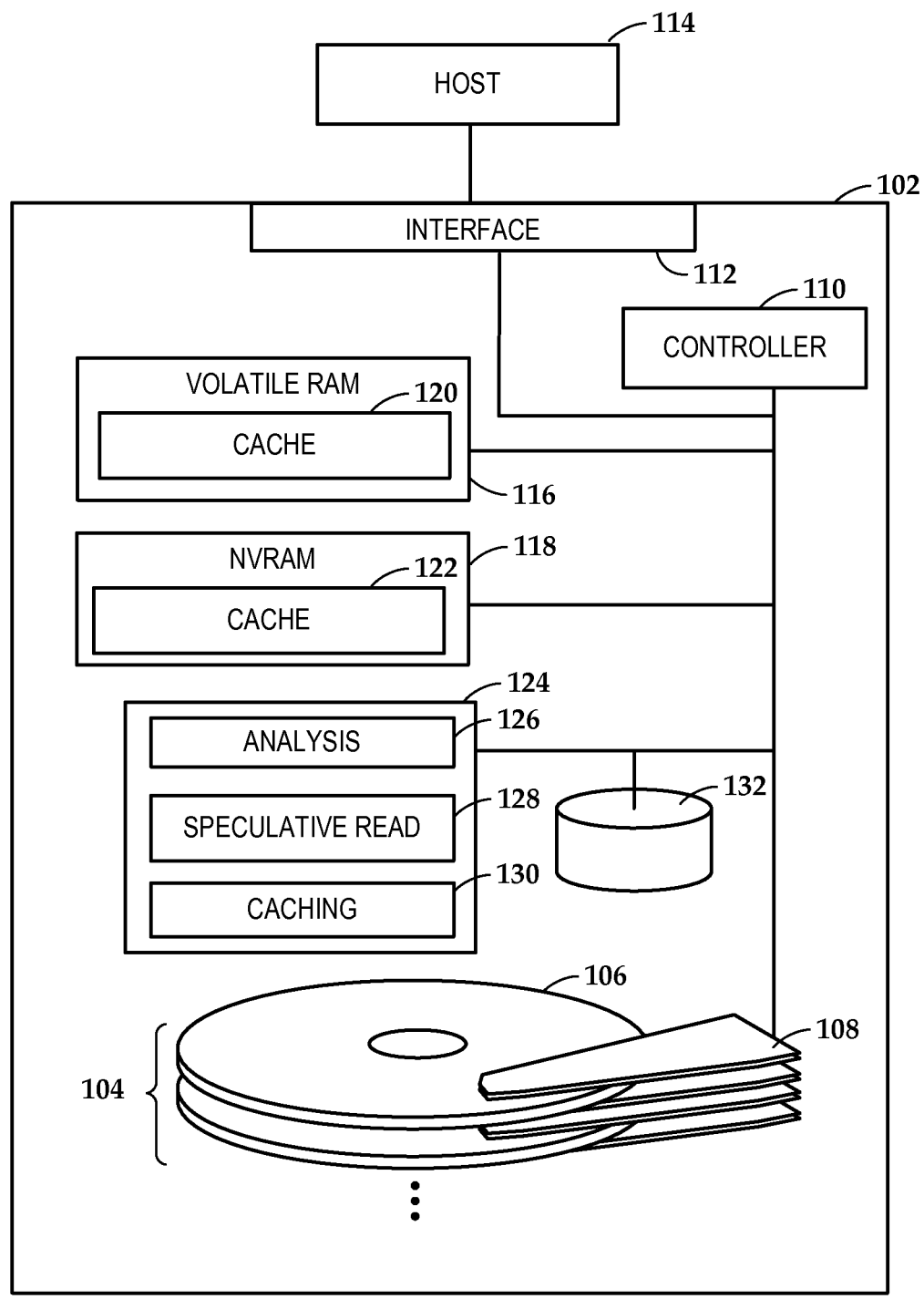
FIG. 1 is a block diagram of an apparatus according to an example embodiment.

In reference now to FIG. 1, a block diagram illustrates an apparatus 102 that includes caching features according to an example embodiment. The apparatus 102 includes main storage 104 that, in this example, includes one or more magnetic disks 106 as a storage media, as well as other circuitry and components. The disks 106 store data as magnetic patterns that are read by sensors (e.g., magnetic read/write sensors) mounted on a pivoting arm assembly 108. A controller 110 is coupled to the arm assembly and controls movement of the arm via an actuator (not shown). The controller 110 sends and receives signals (e.g., via encoder and decoder circuits) to/from one or more read/write heads on the arms, the signals ultimately being converted to data stored on the main storage media 104. While this embodiment shows rotating magnetic disks 106, the concepts described below may be applicable to alternate non-volatile main storage media, including optical or solid-state media.

The apparatus 102 includes a host interface 112 that communicatively couples the apparatus 102 to a host 114. The host interface 112 at least provides a mechanism that allows the host 114 to store and retrieve information to/from the main storage media 104. The host interface 112 may utilize standard communication interfaces and protocols, such as SATA, SCSI, eSATA, SAS, USB, etc. The host interface 112 may provide both a standard means of communication between the apparatus 102 and host 114, as well as abstracting operations of the controller 110 and media 106. For example, the host 114 may access data by way of logical block addresses (LBAs) that are mapped to a different physical addressing scheme used internally by the apparatus 102, e.g., based on cylinders, heads, and sectors.

The controller 110 may utilize various internal adaptations of the apparatus 102 to improve performance or otherwise provide efficient operation with the host 114. For example, the apparatus 102 may include a volatile random-access memory (RAM) 116, such as Dynamic-RAM (DRAM), and non-volatile RAM (NVRAM) 118, such as NAND flash memory. These memory devices 116, 118 may have a number of different uses, such as acting as temporary and permanent stores for data needed by the controller 110 during operation. The memory devices 116, 118 may also be used for caching host data, as represented by respective caches 120, 122.

Data retrieved from or stored to main storage 104 can be held in one or more caches 120, 122 to improve throughput. The caches 120, 122 have faster access and retrieval times than the main storage 104, although generally with less storage capacity. While there is some processing and data transfer overhead in using the one or more caches 120, 122, the faster media used by the cache can significantly improve overall performance of the apparatus 102 under many conditions.

In this configuration, the non-volatile cache 122 acts as a secondary cache, being faster but smaller than the main storage media 104. The volatile cache 120 is a primary cache, being faster but smaller than the non-volatile cache 122. Generally, the terms "primary" and "secondary" refer generally to an immediacy in time and priority to the host interface 112. For example, current read/write requests from the host 114 may be processed first via a lookup directed to the primary cache 120 (identified, e.g., by the data's logical block address). This enables host commands to complete quickly should the requested data be stored in the primary cache 120. If there is a cache miss in the primary cache 120, a lookup is next performed in the secondary cache 122, and then finally the main storage 104. While the secondary cache 122 is described herein as non-volatile, the concepts may be equally applicable to a secondary cache that uses volatile memory. For example, non-volatile memory may be chosen for cost considerations and not for data retention upon loss of power. In such a case, the system may be configured so that no state information is stored for recovery of the secondary cache should power be unexpectedly be lost. In such a configuration, it may be possible to substitute volatile memory in place of the non-volatile memory without loss of functionality, because the data retention features of the non-volatile memory are not being used.

Some of the data stored in the primary cache 120 may either be copied or moved to the secondary cache 122 as new requests come in. If there is a miss in the primary cache 120, the requested data may be found in the secondary cache 122. If not found in either, requested data may be processed via the main storage 104. In this context, the host request may be a read or a write, and the caches 120, 122 may be configured to store this data. The features discussed herein for secondary caches may also be applicable in configurations where a non-volatile cache is not "secondary" in relation to other caches, such as where a non-volatile cache that is maintained in a parallel, non-hierarchical relation to a volatile cache, or used without a volatile cache at all.

The secondary cache 122 in this example may optionally be read-only, in that only data marked for read operations by the host 114 are placed in the secondary cache 122. In such a configuration, data marked for writing are sent directly to the main storage 104, either directly from the host interface 112 or via the primary cache 120. In some applications and configurations (e.g., enterprise storage), it has been found that writing to NVRAM 118 instead of the main storage 104 may not provide sufficient improvement to justify the overhead needed to track and sync write operations between the secondary cache 122 and main storage 104.

The apparatus 102 includes functional modules 124 that perform various functions related to moving data in and out of the caches 120, 122. These modules 124 may include any combination of custom logic circuitry, general-purpose processors/controllers, firmware, and software. The modules 124 include an analysis module 126 configured to determine one or more criteria associated with the host operations. The criteria may be at least indicative of costs associated with moving data in and out of the primary and/or secondary caches 120, 122, and importance of the data in regards to caching.

The analysis module 126 may track history of address ranges, and may assign an importance metric to the address ranges that influence whether the ranges should be targeted for the primary cache 120 and/or secondary cache 122. Examples of determining cache importance metrics are described in U.S. Publication No. 2014/0013052, which is hereby incorporated by reference. The importance metrics may also be used to determine the importance of both newly requested data and currently cached blocks of data. Metrics of cached data can be compared to the same metric applied to a block of unrequested, speculative read data that is being considered for caching. If the importance metric of the speculative data meets or exceeds that of the cached data, the speculative data can be loaded from the main storage 104 and cached, which may cause eviction of the currently cached data from at least one of the caches 120, 122.

A speculative read module 128 may define ranges of speculative data to be pulled from the main storage 104 for purposes of fulfilling speculative (e.g., predicted or anticipated) host read requests. For example, it may be more efficient to place speculative data in the secondary cache 122 that fills out an entire line of the cache, even if not all data placed in the cache 122 has been requested. Due to certain conditions (e.g., a latency incurred in later retrieving the data) it may be beneficial to speculatively read data proximate to host requested data on the disk. The speculative read data might otherwise be passed over when reading the host-requested data, and then have to be re-loaded from the main storage 104 if later requested, resulting in seek delays and other latencies. The speculative data may include data that is before the requested block or after the host-requested data. The speculative data may be placed in one or both caches 120, 122 when fulfilling the immediate request, in the anticipation that the unrequested, speculative data may be the subject of a later request.

The speculative read module 128 may select LBA ranges of speculative data based upon available rotational latency. In cooperation with the analysis module 126, the LBA ranges may also be selected based on any combination of: overall spatial locality of the read workload; the specific cache importance of the host-requested and/or neighboring LBAs; and the relative cache importance of any LBAs that might be evicted from the secondary cache should data be selected for caching. If the LBA ranges meet some combination of these criteria, a range of data is moved into at least one of the caches 120, 122 from the main storage 104.

A caching module 130 is configured to cause data from the main storage 104 to be copied to the volatile cache 120 and/or non-volatile cache 122. The caching module 130 may be coupled to at least the speculative read module 128 to determine ranges of data being cached to determine priority of data during transfer from the main storage 104 to the cache. In conventional arrangements, reading of speculative data may be interrupted to fulfill another host request. In contrast, the caching module 130 of this arrangement may be instructed not to interrupt reading of identified ranges of speculative data in response to another host request, at least until a minimum LBA range has been read and cached. Speculative read metadata, such as the identification of a speculative range addresses and a minimum range size, may be provided to the caching module 130 from the speculative read module 128. The caching module 130 may also be coupled to the main storage 104, controller 110, host interface 112, and caches 120, 122 to cause transfers of data to the caches 120, 122. Any combination of the criteria and speculative read metadata can be stored in a database 132 that is coupled to any of the modules 124, as well as being coupled to other components of the device 102.

Figure 2A:
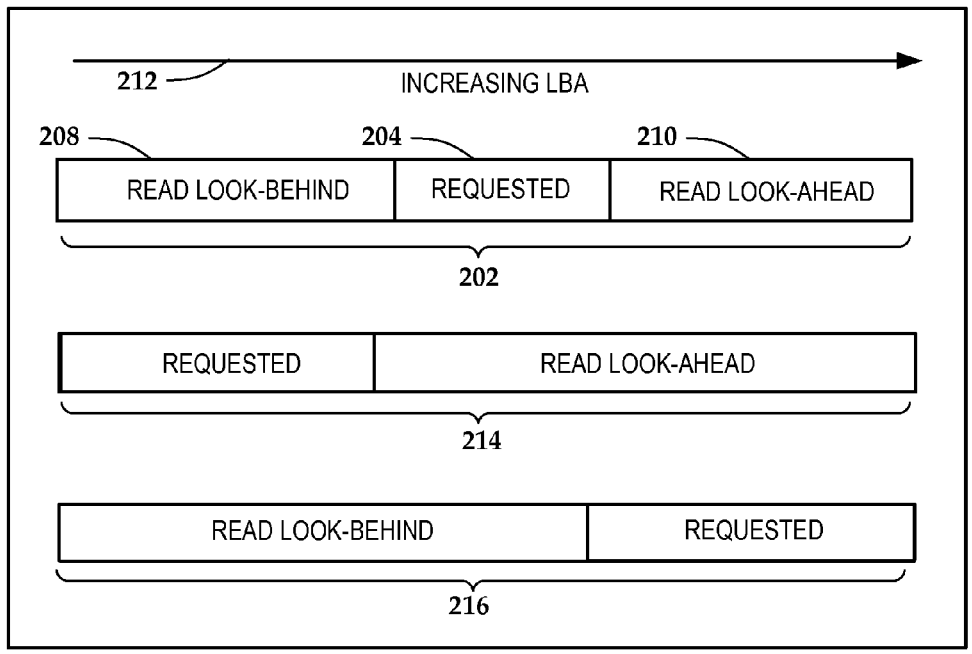
FIG. 2A is a block diagram illustrating examples of speculative read data according to example embodiments.

In reference now to FIG. 2A, a block diagram illustrates speculative read data according to example embodiments. Data 202 represents a contiguous range of LBAs, at least part 204 of which is the subject of a read request. The requested data 204 may be associated with a host read request, and/or may also be associated with other requests. The requested data 204 may be retrieved from a main storage for placement into a primary, volatile cache, with the intention that the data 204 may also be sent to a secondary, non-volatile cache.

In order to improve system efficiency when retrieving the requested data 204, a range 202 of LBAs is defined that encompasses the requested data as well as data that are not requested. This range 202 is referred to herein as a speculative read LBA range. When reading data requested data 204, one or both of additional ranges 208, 210 are identified for speculative reading. Range 208 includes addresses located before the requested LBAs of request 204, and so is referred to as read look-behind data. Range 210 includes addresses located after the requested LBAs of request 204, and so is referred to as read look-ahead data. The relative order of LBAs in FIG. 2 is indicated by line 212, and this may also correspond to relative orders of physical addresses, e.g., disk sectors. While range 202 includes both read look-behind data 208 and read look-ahead data 210, the concepts may apply to one or the other in combination with request data, as shown in speculative read ranges 214 and 216.

The attempt to read the full extent of range 202 may be optional, e.g., the reading of at least speculative ranges 208, 210 may be interrupted/truncated if a new read/write request is received. Alternatively, the range 202 may be defined as a minimum range that is not interruptible in until at least the LBAs within range 202 are read. A hard drive controller may be able to adjust seek delays in order to obtain speculative data 208, 210 without incurring significant penalties. For example, if the drive is currently reading speculative data and a new request is received, the device can calculate a delay time that allows the head to seek to the new position just in time to access the new track. This seek delay may allow reading additional read ahead data without introducing additional latency in accessing the new track. In the present embodiments, this delay may be extended long enough to fill up the speculative range. If the request to read range 202 is defined as non-interruptible, the entire range 202 will be read even if the additional delay introduces some additional latency in processing new requests. In either case, whatever amount of the data 202 is obtained is placed in one or more of the caches. In the arrangement shown in FIG. 1, the data 202 would be placed in the primary cache 120.

Even though the obtained data of range 202 may be placed in a primary cache, the extents of range 202 (e.g., starting LBA, size of data) may be defined based on characteristics of the secondary cache. For example, the size of range 202 may correspond to a cache line size of the secondary cache, or multiples thereof. Similarly, a start LBA of the range 202 may be evenly divisible by the cache line size. Where the secondary cache is implemented as an SSD, the cache lines may be defined as a predetermined number of pages of the SSD. In such a case, secondary cache line sizes may ultimately be based on page sizes of the SSD.

The range 202 may also be defined based on characteristics of the main storage. For example, on magnetic disk drives, a commonly used, minimum physically-addressable unit of data is the sector. Therefore, the range 202 may also be defined to consider sectors sizes as well as (or instead of) mapping to whole lines of secondary cache. For example, a maximum speculative read latency for the system may be defined, so that a maximum number of read-behind or read-ahead sectors (e.g., the number of sectors in one disk rotation) can be speculatively read without substantially impacting average seek delay times. As a result, the data selected for storage as shown in the range 202 may also depend on particular physical characteristics of the main storage.

Figure 2B:
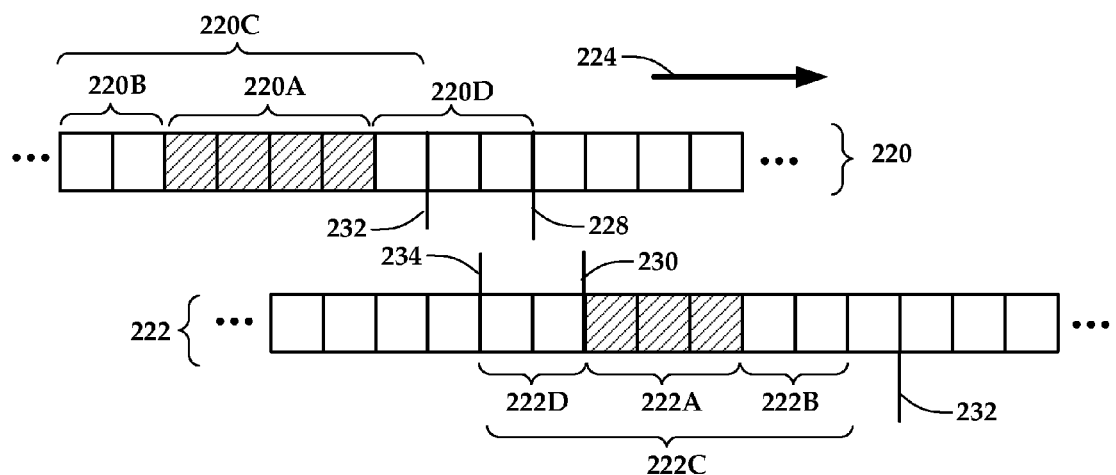
FIG. 2B is a block diagram illustrating how a speculative read algorithm may be tailored for a secondary cache according to an example embodiment.

It will be appreciated that a storage device may already employ some form of read look-ahead and read look-behind capability. In such a case, however, the decisions which drive selection and retrieval of speculative data may not take into account the characteristics of a cache, particularly a secondary cache. An example of how a speculative read algorithm may be tailored for a secondary cache is shown in FIG. 2B. The blocks in FIG. 2B represent sectors within tracks 220, 222 of a hard drive media. The read head (e.g., contained in a hard drive slider) reads in a direction indicated by arrow 224. Because the slider is usually stationary within a track relative to the media, the media would be moving in a direction opposite to arrow 224.

In this example, the read head is located on track 220 to read requested sectors that are indicated by shaded region 220A. The next read request is indicated by shaded blocks 222A of track 222. In order to fulfill this next request, the read head will need to seek from track 220 to 222, and for purposes of clarity in the drawings, it will be assumed that the seek will occur in the space of one block. How and when the sensor seeks from track 220 to track 222 after reading requested data 220A may vary depending on priorities used by speculative read algorithms, as well as other features that may consume rotational latency.

In some hard drives, for example, the algorithms for speculative reading may favor read-ahead data over read-behind data. In such a system, data following 220A would be read up until the seek departure time indicated by point 228, where it would then be able to seek to point 230 in time to read data at 222A. Thus the read-ahead data 220D following request 220A would take precedence over read-behind data 222D before 222A.

Consider a similar scenario as above, but with an algorithm that favors filling out secondary cache lines without regards to whether the data is read-behind or read-ahead. In that case, assume the size of regions 220C and 222C shown in FIG. 2B corresponds to a secondary cache line size of the system, and that the beginning of block 220B has an LBA suitable as a first LBA of a cache line, should the secondary cache have such restrictions. Also, region 220B has been already been read in ahead of region 220A. As a result, the read head only needs to read to point 232 to fill out a cache line, and reading up to point 228 will not provide enough read-ahead data to fill out another cache line. As a result, the system may choose to use an earlier seek departure time at point 232 and be able to obtain read-behind speculative data starting at point 234. This may provide a higher probability that enough speculative data proximate request 222A can be used to fill out a secondary cache line, such as where the reading of speculative data may be interrupted by another request.

For example, assume that another request will require the read head to seek away from track 220 at point 232. If the drive had been configured to optimize read ahead data so that reading of data 222A had begun at point 230 instead of point 234, then there would not be enough data between points 230 and 232 to fill out a secondary cache line. Maximizing read-behind data 222D minimizes the amount of read-ahead data 222B needed to fill out the cache line, which will lower the probability that another request could interrupt the read-ahead data 222B.

The read-behind or read-ahead operations shown in FIG. 2B may be triggered by the cache importance criteria at or near the requested LBA range, or an overall assessment of spatial locality. The desired amounts of speculative read may be specified in order to align backward to the nearest boundary corresponding to the secondary cache line size. Even if the speculative data is first placed into a primary cache, this selection of particular speculative ranges can improve hit rates of the secondary cache. This is because LBA ranges that fill an entire line are the first (or only) ones to be promoted to secondary cache. This may place more emphasis on read-behind data than in current storage devices. This is because the endpoint of read-ahead segments may be opportunistic (e.g., more subject to interruption than read-behind, in cases where the read-ahead is not specified as non-interruptible). Also, the secondary cache policy may truncate the read-ahead ranges at the cache line boundary when being copied to the secondary cache, thus causing some read-ahead data to be discarded anyway.

Figure 3:
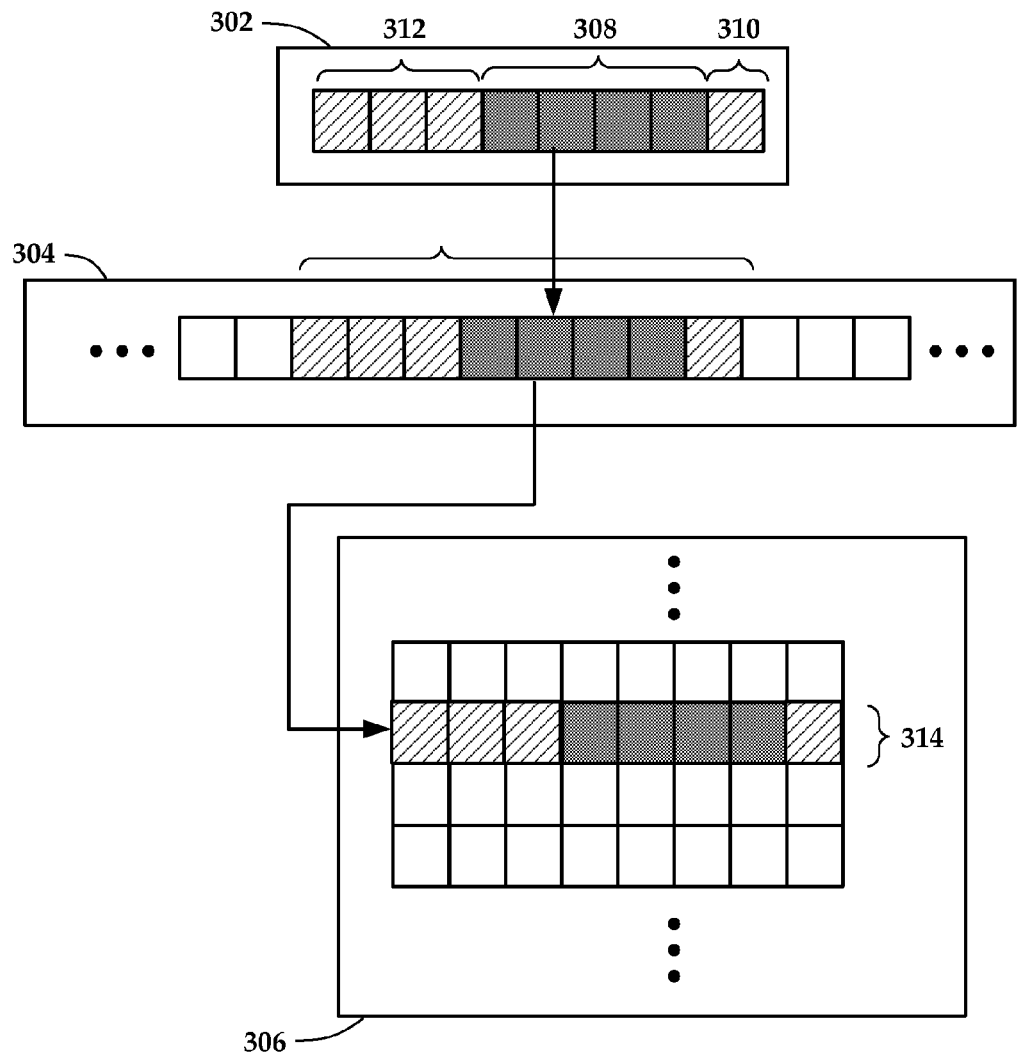
FIG. 3 is a block diagram illustrating caching of speculative read data according to an example embodiment.

In reference now to FIG. 3, a block diagram illustrates an example of filling a secondary cache with speculative data according to an example embodiment. A block of data 308 is retrieved from a main storage 302, e.g., in response to an initial host read request for data that has not previously been cached. From the main storage 302, data flows to a primary, volatile cache 304, and then to a secondary, non-volatile cache 306. Subsequent read requests for the data 308 will first attempt to find the data in the primary cache 304, and then the secondary cache. If the request misses in both caches 304, 306, the data 308 are retrieved from the main storage 302.

When reading a block of data 308 from the main storage 302, the storage device may perform speculative reading, e.g., it may read non-requested user data blocks 310, 312 following or preceding the requested data, and place the data blocks 310, 312 in a buffer in anticipation of a future read request.

Using criteria described in greater detail below, a storage device may mark one or both of blocks 310, 312 as speculative ranges. Speculative ranges may have priority for retrieval from main storage (e.g., another read/write request will not interrupt loading of the speculative data) so that one or both blocks 310, 312 get loaded into one or both of the caches 304, 306 together with the requested data 308. The data 308, 310, 312 may be first loaded into the primary cache 304, then later moved to the secondary cache 306. Alternatively, the data 308, 310, 312 may be moved into both caches 304, 306 at the same time, or directly into the secondary cache 306 without first being placed in the primary cache 304.

The total size of one or both speculative LBAs 310, 312 and requested data 308 may be selected to make caching operations more efficient. In the illustrated examples, the total size of blocks 308, 310, 312 is selected to be the same as cache lines (e.g., line 314) of the secondary cache 306. As such, when the blocks 308, 310, 312 are determined to be speculative candidates, the blocks 308, 310, 312 are loaded into the secondary cache 306, either directly or via the primary cache 304. It will be appreciated that alternate configurations may be tuned for cache-line sizes of the primary cache 304. In such a case, the speculative candidate blocks 308, 310, 312 are loaded into the primary cache 304, and selection of address ranges for movement to the secondary cache 306 may depend on other factors rather than secondary cache line-size.

A device according to the embodiments described herein may extend the speculative reading algorithm of a conventional HDD by one or more speculative read operations. The speculative read operations be based on host read history locality determination, and target speculative ranges may be selected to align with secondary cache line size and starting address conventions. The speculative feature may ensure that read data is provided in the primary cache so that the secondary cache can efficiently utilize the data should it be a candidate for a fill operation.

Figure 4:
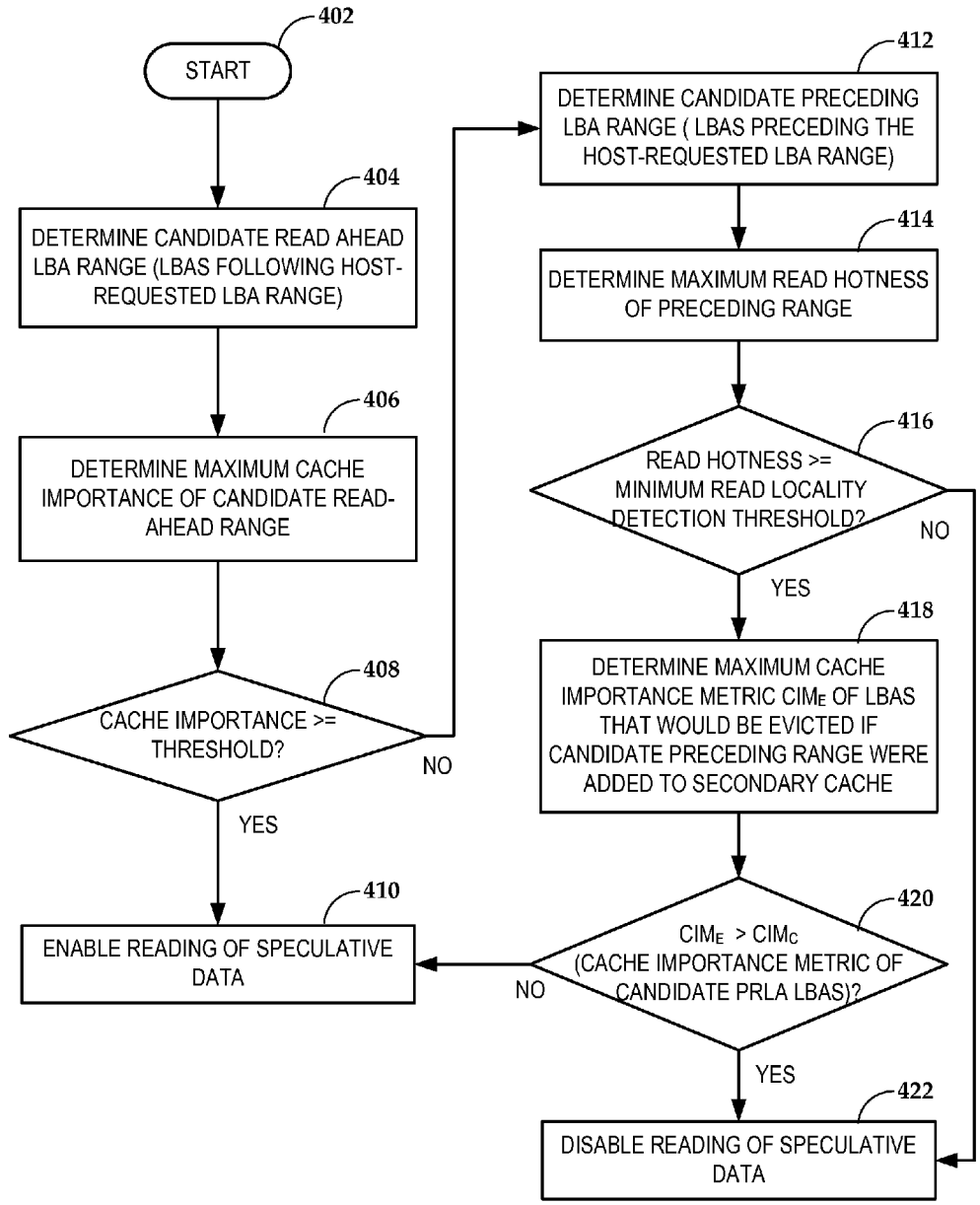
FIG. 4 is a flowchart illustrating a procedure to determine promoting of speculative data according to an example embodiment.

In some embodiments, a speculative read operation may attempt to read a specified minimum number of LBAs beyond the requested range in LBA space. In reference now to FIG. 4, a flowchart illustrates a more detailed example of how speculative LBAs may be selected. The procedure starts 402 in response to some data request event, such as a host read request for a target LBA range. A candidate speculative read-ahead range is determined 404. This range is a number of LBAs following the host-requested range that will be targeted for read-ahead if certain criteria are met.

The speculative read-ahead LBAs may be chosen to optimize overall performance for enterprise-class workloads, and may account for the secondary cache line size and filling speed, as well as the disk data rate and potential access time penalties incurred by invoking speculative reads. After the candidate speculative range is determined 404, a maximum cache importance of the candidate range is determined 406. This determination 406 may involve deriving a cache importance metric as described in U.S. patent application Ser. No. 13/542,990 noted above.

The cache importance metric may be found by looking at spatial locality of recent requests (e.g., LBA ranges experiencing higher than average activity) and levels of activity associated with those requests (e.g., read "hotness" of the LBA ranges). The cache importance may be generic or specific to one of the primary or secondary cache. For example, the primary cache may have differing sets of priorities relative to LBA ranges than the secondary cache, e.g., due to the expected time that data is expected to be retained in the respective caches. In particular, where data ranges are selected to comply with cache line characteristics of the secondary cache, the cache metric importance may also be calculated with respect to the secondary cache as well.

The metric found at 406 is compared to a threshold value at 408. If the metric meets the threshold, reading of the candidate speculative LBA range is enabled 410. In some embodiments, enabling 410 the speculative read may also ensure retrieval of the speculative data is not aborted prior to reading the minimum range if a new read request is received. In other embodiments, the enabling 410 may just result in a best effort to read in the range, but will allow pre-emption of the speculative read for some requests so as to minimize latency in fulfilling the requests.

If comparison at 308 determines the cache importance metric does not meet the threshold, a speculative range of preceding LBAs is determined 412. In this example, the read hotness of the preceding range is determined, and compared 416 to a threshold. As described elsewhere herein, read hotness may refer to activity levels of recent read requests within the preceding LBAs. The spatial locality of the recent read requests may optionally be considered at 414, e.g., high levels of activity proximate to preceding LBAs. If the read hotness of the preceding LBA range does not meet the threshold, then speculative read is disabled 422 for the range. This disabling 422 may involve going to a fallback strategy for speculative reading, e.g., maximizing read-ahead data regardless of cache importance or size, temporarily disabling speculative reading, etc.

If the read hotness of the preceding LBA range meets the threshold, then a determination 418 is made regarding the cache importance metric ($CIM_E$) of LBAs that would be evicted from the secondary cache if the candidate preceding range was added to the cache. This metric $CIM_E$ is compared to the cache importance metric of the candidate range, $CIM_C$. This latter metric $CIM_C$ may have been previously determined at 414, as read hotness may be one component of the cache importance metric. If it is determined at 420 that $CIM_E > CIM_C$, then speculative reading is disabled 422 for the preceding LBA range; otherwise it is enabled 410. It should be noted that determination 420 will always return "no/false"

if no data would be evicted from the secondary cache in response to adding the speculative data.

It should be noted that the determination at 420 may be performed even if the speculative data is not intended to be placed directly in the non-volatile cache and evict the cached data. For example, the speculative data may be placed in the primary, volatile cache. This or another event may trigger evicting data from the primary cache, and a determination is made as to what should be evicted. The evicted data may either be moved to the secondary cache, causing the above noted secondary cache eviction, or deleted from the primary cache. The latter situation may occur, for example, where low priority read/write cache data is considered for eviction from the primary cache. If the secondary cache is used for read-only data, then the read/write cache data would not be targeted for secondary caching, and would just be cleared from the primary cache.

Figure 5:
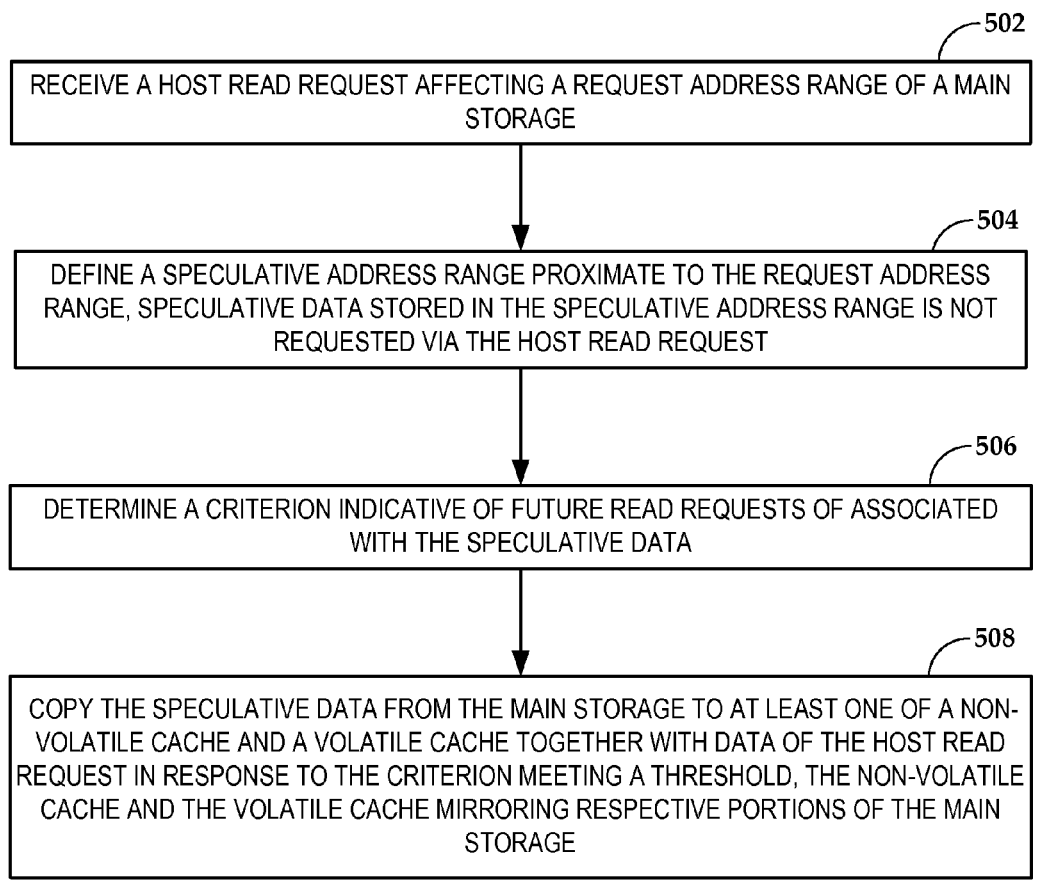
FIG. 5-6 are flowcharts of procedures according to other example embodiments.

In reference now to FIG. 5, a flowchart illustrates a procedure according to an example embodiment. A host read request affecting a request address range (e.g., LBA range) of a main storage is received 502. In response to the read request, a speculative address range proximate to the request address range is defined 504. Speculative data stored in the speculative address range is not requested via the host read request. The speculative address range may be selected based on a cache line size of at least one of the non-volatile cache and the volatile cache.

A criterion indicative of future read requests of associated with the speculative data is determined 506. For example, the speculative address range may located before and/or after the request address range, and the criterion may include a cache importance metric of the non-volatile cache regarding the speculative data. In either of these cases, the criteria may further include comparing a cache importance metric of the speculative data to a cache importance metric of cached data that would be evicted from the non-volatile cache in response the copying of the speculative data from the main storage to at least one of the non-volatile cache and the volatile cache.

The speculative data is copied 508 from the main storage to at least one of a non-volatile cache and a volatile cache together with data of the host read request in response to the criteria meeting a threshold. The non-volatile cache and the volatile cache mirror respective portions of the main storage. The copying of the speculative data may involve not interrupting the copy operation in response to another host request being received, at least until the speculative address range has been copied.

The main storage may include a magnetic disk drive. In such a case copying 508 the speculative data from the main storage to the non-volatile cache may involve adjusting a seek departure time of the magnetic disk drive to read the speculative data. For example to read speculative data addresses before the host requested data, the seek may occur early (e.g., interrupting/truncating an in-progress, low priority operation such as other speculative reads) so that the preceding data can be retrieved. If the speculative data addresses are located after the host requested data, a seek for subsequent requests can be delayed until the speculative address range is copied to one or more caches.

Figure 6:
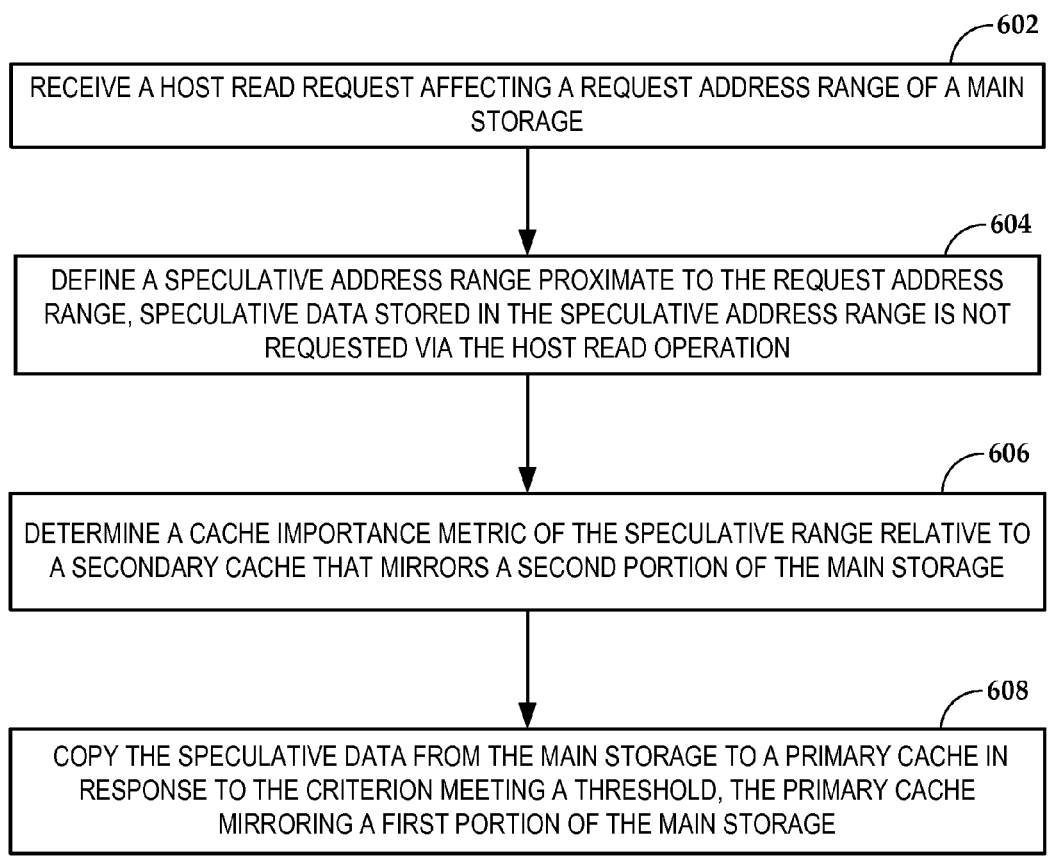

In reference now to FIG. 6, a flowchart illustrates a procedure according to another example embodiment. A host read request is received 602 affecting a request address range of a main storage. A speculative address range proximate to the request address range is defined 604. Speculative data stored in the speculative address range is not requested via the host read request. The speculative address range may be selected based on at least one of a size and an allowable starting address of cache lines of the secondary cache. The speculative address range may include a first range preceding the request address range and a second range following the request address range.

A cache importance metric of the speculative range is determined 606. The metric is relative to a secondary cache that mirrors a second portion of the main storage. The speculative data is copied 608 from the main storage to a primary cache in response to the criterion meeting a threshold, the primary cache mirroring a first portion of the main storage.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a processor configured to:
   define a speculative address range proximate to a request address range associated with a host read request affecting a main storage of the apparatus, wherein speculative data stored in the speculative address range is not requested via the host read request and the speculative address range is selected based on a cache line size of a non-volatile cache;
   determine a criterion indicative of future read requests of associated with the speculative data; and
   copy the speculative data from the main storage to a volatile cache together with data of the host read request in response to the criterion meeting a threshold, the non-volatile cache and the volatile cache mirroring respective portions of the main storage.

2. The apparatus of claim 1, wherein the copying of the speculative data is not truncated in response to another host request being received while the data is being copied.

3. The apparatus of claim 1, wherein the speculative address range is located after the request address range, and wherein the criterion comprises a cache importance metric of the non-volatile cache regarding the speculative data.

4. The apparatus of claim 1, wherein the speculative address range is located before the request address range, and wherein the criterion comprises a cache importance metric of the non-volatile cache regarding the speculative data.

5. The apparatus of claim 1, wherein the criterion further comprises comparing a cache importance metric of the speculative data to a cache importance metric of cached data that would be evicted from the non-volatile cache in response the copying of the speculative data from the main storage to at least one of the non-volatile cache and the volatile cache.

6. The apparatus of claim 1, wherein the main storage comprises a magnetic disk drive, and wherein copying the speculative data from the main storage to the non-volatile cache comprises adjusting a seek departure time of the magnetic disk drive to read the speculative data.

7. The apparatus of claim 1, wherein the criterion comprises a cache importance metric determined based on spatial locality of recent read activity.

8. A method comprising:
    receiving a host read request affecting a request address range of a main storage;
    defining a speculative address range proximate to the request address range, wherein speculative data stored in the speculative address range is not requested via the host read request and the speculative address range is selected based on a cache line size of a non-volatile cache;
    determining a criterion indicative of future read requests of associated with the speculative data; and
    copying the speculative data from the main storage to a volatile cache together with data of the host read request in response to the criterion meeting a threshold, the non-volatile cache and the volatile cache mirroring respective portions of the main storage.

9. The method of claim 8, wherein the copying of the speculative data is not truncated in response to another host request being received while the data is being copied.

10. The method of claim 8, wherein the speculative address range is located after the request address range, and wherein the criterion comprises a cache importance metric of the non-volatile cache regarding the speculative data.

11. The method of claim 8, wherein the speculative address range is located before the request address range, and wherein the criterion comprises a cache importance metric of the non-volatile cache regarding the speculative data.

12. The method of claim 8, wherein the criterion further comprises comparing a cache importance metric of the speculative data to a cache importance metric of cached data that would be evicted from the non-volatile cache in response the copying of the speculative data from the main storage to at least one of the non-volatile cache and the volatile cache.

13. The method of claim 8, wherein the main storage comprises a magnetic disk drive, and wherein copy the speculative data from the main storage to the non-volatile cache comprises adjusting a seek departure time of the magnetic disk drive to read the speculative data.

14. The method of claim 8, wherein the criterion comprises a cache importance metric determined based on spatial locality of recent read activity.

15. A method comprising:
    receiving a host read request affecting a request address range of a main storage;
    defining a speculative address range proximate to the request address range, wherein speculative data stored in the speculative address range is not requested via the host read request and the speculative address range is selected based on a size of cache lines of a secondary cache that mirrors a second portion of the main storage;
    determining a cache importance metric of the speculative address range relative to the secondary cache; and
    copying the speculative data from the main storage to a primary cache in response to the metric meeting a threshold, the primary cache mirroring a first portion of the main storage.

16. The method of claim 15, wherein the speculative address range is selected further based on an allowable starting address of the cache lines of the secondary cache.

17. The method of claim 15, wherein the cache importance metric comprises at least one of:
    a level of recent read activity associated with an address range of the speculative data;
    a spatial locality of the recent read activity associated with the address range of the speculative read data; and
    a cache importance metric of the speculative data meeting or exceeding a cache importance metric of cached data that would be evicted from the secondary cache in response the copying of the speculative data from the main storage to the primary cache.

18. The method of claim 15, wherein the speculative address range includes a first range preceding the request address range and a second range following the request address range.

* * * * *